Sept. 10, 1940. R. S. KINKEAD 2,214,501
MOWER
Filed Sept. 3, 1937 2 Sheets-Sheet 1
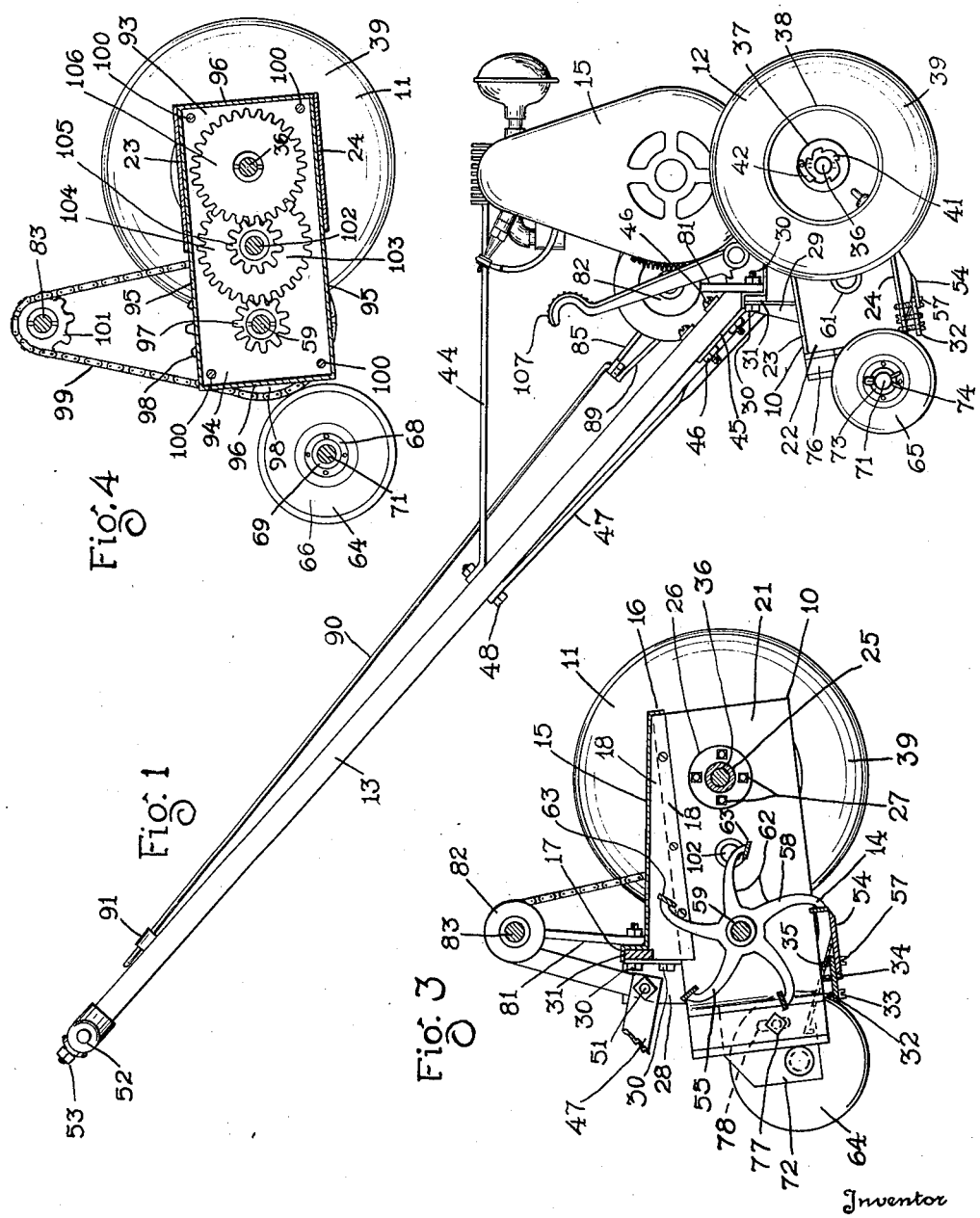
Inventor
Robert S. Kinkead
By Caswell & Lagaard
Attorneys

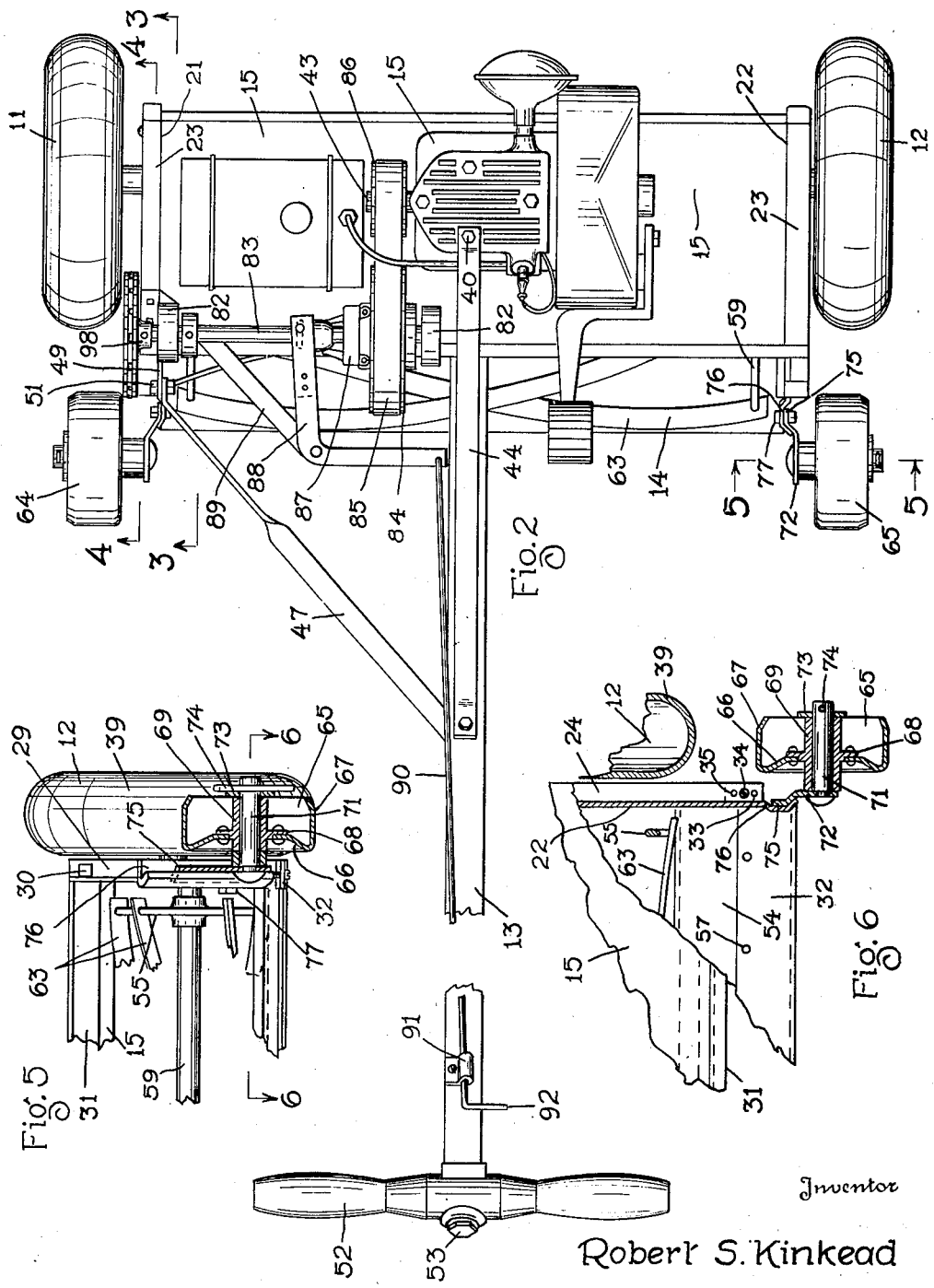

Patented Sept. 10, 1940

2,214,501

UNITED STATES PATENT OFFICE 2,214,501

MOWER

Robert S. Kinkead, St. Paul, Minn.

Application September 3, 1937, Serial No. 162,310

1 Claim. (Cl. 56—26)

My invention relates to mowers and has for an object to provide an extremely simple and practical mower for cutting grass, weeds and similar vegetation.

Another object of the invention resides in providing a mower which will be extremely easy to handle and manipulate.

A still further object of the invention resides in providing a mower with which extremely sharp turns can be made.

Another object of the invention resides in providing a mower having pivot wheels properly positioned with respect to the center of gravity to the mower so that the mower may be readily tilted on said pivot wheels to raise the front driving wheels above the ground and terminate propulsion of the mower.

An object of the invention resides in arranging the pivot wheels directly rearwardly of the front driving wheels and in fairly close proximity thereto.

Another object of the invention resides in providing a mower in which all manipulation and handling of the mower, excepting when the mower is running forward, can be accomplished by tilting the mower on the pivot wheels.

A still further object of the invention resides in spacing the pivot wheels from one another and in arranging the pivot wheels laterally of the grass cutting mechanism so that the grass cutting mechanism is free to operate without obstruction. The feature of the invention resides in utilizing the pivot wheels both as pivot wheels and as gauge wheels for determining the height of the standing grass.

Other objects of the invention reside in the novel combination and arrangement of parts and in the details of construction hereinafter illustrated and/or described.

In the drawings:

Fig. 1 is a side elevational view of a mower illustrating an embodiment of my invention.

Fig. 2 is a plan view of a portion of the structure shown in Fig. 1.

Fig. 3 is a longitudinal sectional view of the mower taken on line 3—3 of Fig. 2.

Fig. 4 is a sectional view similar to Fig. 3 taken on line 4—4 of Fig. 2.

Fig. 5 is an elevational sectional detailed view taken on line 5—5 of Fig. 2.

Fig. 6 is a plan sectional detailed view taken on line 6—6 of Fig. 5.

In the mowing of the grass by power mowers it becomes highly desirable to have a mower which can be readily manipulated and which can be easily handled and rapidly turned about. The present invention provides a mower by means of which all of these desirable characteristics are procured.

My invention comprises a frame 10 which is supported through front driving wheels 11 and 12 and pivot wheels 64 and 65. A handle 13 is attached to the frame 10 and extends upwardly and rearwardly therefrom. Mounted on the frame 10 is a grass cutting device indicated in its entirely by the reference numeral 14. A motor 15 is also carried by the frame 10 and serves to drive the wheels 11 and 12 and operate the grass cutting device 14. These various parts will now be described in detail.

The frame 10 is best shown in Figs. 1 and 3, and comprises two side plates 21 and 22 constructed of sheet metal. These side plates are formed with flanges 23 and 24 which project outwardly therefrom. The plates 21 and 22 are held in spaced relation by means of a tube 25 which has secured to the ends thereof flanges 26 which are attached to said plate by means of machine screws 27. At the upper portions of the side plates 21 and 22 are provided short uprights 28 and 29 which are welded thereto and which extend upwardly therefrom. Attached to these uprights by means of bolts 30 is a rear cross bar 31 which holds the two side plates properly spaced at their upper rearward portions. At the lowermost rearward portions of side plates 21 and 22 is provided a bed knife bar 32 which is attached to the flanges 24 of the side plates 21 and 22 by means of screws 33, 34 and 35. These screws permit of adjustment of the plate 32 for a purpose to be subsequently and fully described. Attached to the upper portion of the frame 10 is a sheet metal guard 15 which is constructed at its forward end with a depending flange 16 and at its rearward end with an upwardly extending flange 17. This guard is further constructed at its ends with depending flanges 18 which overlie the inner surfaces of the side plates 21 and 22 and which are bolted thereto. The flange 17 is similarly bolted to the cross bar 31 of the frame.

The two front drive wheels 11 and 12 are mounted and driven in the following manner. Within the tube 25 is disposed an axle 36 which is journaled in suitable bushings therein, not shown in the drawings. The two wheels 11 and 12 may be of conventional design and are preferably formed with hubs 37 having rims 38 on which are mounted rubber tires 39. The wheels 11 and 12 are rotatably mounted on the axle 36 and are driven by means of said axle through ratchet wheels 41 attached to said axle and pawls 42 pivoted to the hubs 37 and cooperating with the ratchet wheels.

The handle 13 may be constructed of wood or any other similar material and is attached to a bracket 45 which is secured to the cross bar 31 of frame 10. This bracket may be welded to said cross bar or otherwise attached thereto. Two bolts 46 extend through said bracket and handle to rigidly attach the handle to the frame 10. For the purpose of bracing the handle 13 a brace 47 is employed which is attached to the handle 13 by means of a bolt 48 and which is similarly attached to the upright 28 issuing upwardly from the end plate 21. This is accomplished by means of a bolt 51 which passes jointly through said brace and upright. In addition to the brace 47 another brace 44 is used which is attached to the handle 13 and to the engine 15. If desired, bolt 48 may also be used for securing the brace 44 to the handle 13 as illustrated. The handle 13 is constructed with a handle bar 52 which extends transversely thereof at its upper end and is secured to the handle by means of a lag screw 53.

The motor 15 may be of any desired construction and for the purpose of simplicity a small gasoline engine has been shown which is provided with a crank shaft 43 from which power may be taken from the engine. Inasmuch as the construction of the engine forms no feature of the present invention, the same has not been shown in detail although it can readily be comprehended any type of engine can be used or an electric motor or other source of power can be employed for the purpose. The motor 15 is mounted on frame work not shown in the drawing which is secured to the bar 31 and the tube 25. The engine is further braced by means of the brace 44 which is connected to the upper portion of the same through a bolt 40 and to the handle 13 of the mower as previously described.

The grass cutting device 14 consists of a bed knife 54 and a reel 55 cooperating therewith. The bed knife 54 is secured to the bed knife bar 32 by means of a number of screws 57 which pass through slots in the bed knife not illustrated and are threaded into the bar 32. By means of screws 33, 34 and 35 the elevation of the bed knife may be adjusted at will By means of screws 57, the position of bed knife, forwardly and rearwardly, may be likewise adjusted.

The reel 55 consists of a number of spiders 58 which are attached to a shaft 59. Shaft 59 extends transversely between the two side plates 21 and 22 and is journaled in suitable bearings 61 attached thereto. The spiders 58 are constructed with arms 62 which support at their ends blades 63 adapted to cooperate with the bed knife 54 and to cut the grass coming between the bed knife and the said blades.

The rearward portion of the frame 10 is wheel supported by means of the two pivot wheels 64 and 65. Inasmuch as these wheels are identical in construction and supported in the same manner only wheel 65 will be described in detail.

This wheel is constructed from sheet material and is formed with a web 66 and a rim 67 integral therewith. The web 66 is attached to a flange 68 formed on a hub 69. Hub 69 is journaled for rotation on a stub shaft 71 which issues outwardly from a bracket 72. A washer 73 mounted on the end of stub shaft 71 is held in place by means of a cotter key 74 which in conjunction with bracket 72 deprives the wheel 65 of endwise movement along the stub shaft. The bracket 72 is constructed with an off-set vertical portion 75 which is adapted to slide in a vertical groove 76 formed in the rearward portion of the side plate 22. This groove forms a guide along which the portion 75 is guided for vertical movement whereby wheel 65 may be raised and lowered with reference to frame 10. The bracket 72 is held in adjusted position with respect to the groove 76 by means of a bolt 77 which passes through the side plate 22 and a slotted hole 78 in the bracket 72. By means of this construction the wheels 64 and 65 may be raised and lowered to gauge the height of the standing grass.

The two pivot wheels are of a diameter considerably greater than the diameter of rollers ordinarily used with mowers of the reel type. It will also be noted that the treads of these wheels are fairly large so that the said wheels support the rearward portion of the mower frame equally as well as the rollers heretofore used. The pivot wheels 64 and 65 are so arranged that they trail the front drive wheels 11 and 12 and so that the same are disposed entirely outwardly beyond the reel 55 and bed knife 54. Furthermore the stub axles on which these wheels are mounted are also disposed outwardly of the reel and bed knife so that the discharge from the cutting device 14 is free from the pivot wheels. By means of this construction the pivot wheels can be positioned fairly closely to the front drive wheels 11 and 12 and much closer to the center of gravity of the mower than if positioned rearwardly of the reel and bed knife plate as is customary and necessary when utilizing rollers. The pivot wheels 64 and 65 are of sufficient diameter and have a tread sufficient so that the same properly support the entire weight of the mower when the mower is tilted back on the same in a manner to permit of easily and readily moving the mower over the ground on these wheels. I have found that the trailer wheels operate best when the diameter thereof exceeds one-fourth the diameter of the drive wheels. About four inches in diameter to every 100 lbs. weight has been found to be desirable. I have also found that if wheels of a diameter as small as the diameter of ordinary rollers be employed that it becomes practically impossible to manipulate the mower once the same has been tilted up on such wheels or roller. This permits of raising forward portion of the mower by pivoting the entire mower on the pivot wheels, for the purpose of manipulating the mower as will be hereinafter more fully described.

The drive wheels 11 and 12 are driven by the motor 15 in the following manner. Attached to the cross bar 31 of frame 10 are two standards 81 which are constructed with bearings 82 which journal a countershaft 83. This countershaft is provided with a pulley 84. A belt 85 passes over this pulley and over another pulley 86 attached to the crank shaft 43 of the motor 15. The pulley 84 rotates freely on shaft 83 and may be coupled thereto by means of a clutch 87. Clutch 87 is operated by a lever 88 which is pivoted to a bracket 89 secured to the cross bar 31. A link 90 is connected to the lever 88 and is guided at its upper end by a guide 91 secured to the handle 13. This link is bent as designated at 92 to form a handle by means of which the same may be manipulated.

Between the flanges 23 and 24 of the side plate 21 is formed a gear case 93. A plate 94 overlies the plate 21 and forms the outer wall of this gear case. Flanges formed on this plate extend up to the plate 21 and form the other walls of the case which are indicated at 95 and 96. The plate 94 is attached to the plate 21 by means of bolts 100. The reel shaft 59 extends through the gear case 93 and also through the plate 94 of said gear case. This shaft has mounted upon it, within the gear case 93, a spur pinion 97 and upon the exterior of the plate 94 a sprocket wheel 98. The reel shaft 59 is driven from the countershaft 83 by means of a chain 99 which passes over the sprocket wheel 98 and another sprocket wheel 101 fast on the shaft 83.

The axle 36 on which the two wheels 11 and 12 are mounted extends through the gear case 93 and is driven in the following manner. Attached to the side plate 21 of frame 10 and within the gear case 93 is a stub shaft 102. This stub shaft rotatably supports a gear cluster 103 which consists of a spur gear 104 and a spur pinion 105 adapted to rotate on said stub shaft as a unit. The gear 104 meshes with the spur pinion 97 attached to shaft 59 while the spur pinion 105 meshes with a spur gear 106 fast on the axle 36. By means of this construction the wheels 11 and 12 are rotated at a reduced rate of speed as compared to the reel 55.

The method of operating my invention is as follows. The engine is first started by means of a crank lever 107 while the clutch 87 disconnects shaft 83 from pulley 84. As soon as the engine is running properly the clutch 87 may be engaged by manipulating handle 92 of link 90. This sets in operation the reel 55 and at the same time propels both wheels 11 and 12 through the ratchets 41 and the pawls 42. The operator now follows the mower and steers the same by means of the handle bar 52. If the operator desires to change the course of the mower he may readily raise the drive wheels 11 and 12 from the ground. Such movement is procured by tilting the handle 13 downwardly and pivoting the entire mower on the pivot wheels 64 and 65. This is readily accomplished for the reason that the two pivot wheels 64 and 65 are in close proximity to the wheels 11 and 12 and are fairly near to the center of gravity of the mower. Due to the fact that two independent pivot wheels are employed instead of a roller the entire mower may be swung about or backed up without appreciable effort and such maneuvering of the mower is quickly and conveniently accomplished. True differential action cannot be ordinarily procured by the use of ratchet wheels and pawls. However with my invention the front driving wheels may be raised and the mower turned about equally as conveniently as where a gear type of differential is used. When the mower is in position the same is brought into action by merely raising the handle 13 whereupon the wheels 11 and 12 engage the ground and propulsion of the mower immediately begins. With mowers constructed in the ordinary manner and utilizing rollers it is necessary that the rollers be situated appreciably rearwardly of the reel and bed knife so that the discharge from the grass cutting device follows in advance of the roller. With the rollers so positioned it becomes impossible to conveniently raise the mower by tilting the same on the rollers and it therefore becomes necessary to throw out the clutch before the ordinary power driven mower can be turned about or reversed. With applicant's invention, the mower can be run close up to an object and by merely raising the forward portion of the mower the propulsion of the mower is terminated. This permits a cutting close to the object. In other mowers the operator must be able to guage the distance traveled by the mower during disengagement of the clutch in order to cause the mower to stop at the right locality. When the operation of the mower is to be temporarily stopped the shaft 83 is disconnected from the engine through the manipulation of the clutch 87.

My invention is highly advantageous in that an extremely inexpensive mower is provided. The mower is extremely easy to handle and can make extremely sharp turns. The stopping of the mower is accomplished by action on the part of the operator which is extremely natural so that no confusion results. By means of the large diameter pivot wheels the mower is properly supported when the mower is in operation. The pivot wheels of my invention serve the dual function of pivoting the mower and also serve as gauge wheels for determining the height of the standing grass. With my invention a clear space is left immediately rearwardly of the cutting device so that there is nothing on which the discharge from the cutting device may be deposited. With my invention the two separate pivot wheels accommodate the differential action of the front wheels procured through the ratchets whereby the machine may be sharply turned. The pivot wheels of my invention are located sufficiently close to the center of gravity of the mower so that the mower can be readily pivoted on the same.

Changes in the specific form of my invention, as herein disclosed, may be made within the scope of what is claimed without departing from the spirit of my invention.

Having described my invention, what I claim as new and desire to protect by Letters Patent is:

In a power driven mower, a frame including spaced side plates, a source of power carried by the frame, front driving wheels carried by the plates and disposed outwardly thereof for supporting the frame said driving wheels being driven by the source of power, a bed knife carried by the frame and disposed rearwardly of the axis of the driving wheels, a reel cooperating with the bed knife and disposed between said plates, said reel being driven by the source of power and discharging rearwardly a pair of pivot wheels supporting the frame at the rearward portion thereof, guides formed on said plates at the rearward ends thereof and extending in an up and down direction, brackets carrying said pivot wheels, means on said brackets slidable along said guides, and means for adjustably securing said brackets relative to said side plates.

ROBERT S. KINKEAD.